(12) United States Patent
Blush

(10) Patent No.: US 10,280,312 B2
(45) Date of Patent: May 7, 2019

(54) COATED ARTICLE SUPPORTING HIGH-ENTROPY NITRIDE AND/OR OXIDE THIN FILM INCLUSIVE COATING, AND/OR METHOD OF MAKING THE SAME

(71) Applicant: Guardian Glass, LLC, Auburn Hills, MI (US)

(72) Inventor: Jason Blush, Milford, MI (US)

(73) Assignee: Guardian Glass, LLC, Auburn Hills, MI (US)

( * ) Notice: Subject to any disclaimer, the term of this patent is extended or adjusted under 35 U.S.C. 154(b) by 135 days.

(21) Appl. No.: 15/214,723

(22) Filed: Jul. 20, 2016

(65) Prior Publication Data

US 2018/0022928 A1    Jan. 25, 2018

(51) Int. Cl.
*C09D 5/00* (2006.01)
*C09D 1/00* (2006.01)
(Continued)

(52) U.S. Cl.
CPC ............ *C09D 5/006* (2013.01); *C03C 17/225* (2013.01); *C03C 17/23* (2013.01); *C03C 17/36* (2013.01);
(Continued)

(58) Field of Classification Search
USPC ........ 359/359, 360, 584, 585, 586; 428/336, 428/432, 433, 697, 698, 699
See application file for complete search history.

(56) References Cited

U.S. PATENT DOCUMENTS 6,472,072 B1 * 10/2002 Ebisawa ........... B32B 17/10036
428/432
8,693,097 B2    4/2014 Broadway et al.
(Continued)

FOREIGN PATENT DOCUMENTS

EP    1 889 818 A1    2/2008
EP    1 656 328 B1    4/2017
(Continued)

OTHER PUBLICATIONS

Hsieh et al "Structure and properties of two Al—Cr—Nb—Si—Ti high-entropy nitride coatings" Surf & Coat Tech 221 (2013) p. 118-123.*
(Continued)

*Primary Examiner* — Archene A Turner
(74) *Attorney, Agent, or Firm* — Nixon & Vanderhye P.C.

(57) ABSTRACT

Certain example embodiments relate to coated articles supporting high-entropy nitride and/or oxide thing film inclusive coatings, and/or methods of making the same. The example high-entropy alloys systems described herein are heat stable and may be used in optical coatings. A first material system that may be used in connection with certain example embodiments includes SiAlN with one or more (and preferably two or more) of elements such as Hf, Y, Zr, Ti, Ta, and Nb. A second material system that may be used in connection with certain example embodiments includes TiO, with one or more (and preferably two or more) of elements such as Fe, Co, Ni, Sn, Zn, and N. The material systems may in some cases be high-index materials that can serve as a substitute for titanium oxide in layer stacks, in some example applications.

13 Claims, 7 Drawing Sheets

(51) Int. Cl.
*C03C 17/22* (2006.01)
*C03C 17/23* (2006.01)
*C03C 17/36* (2006.01)

(52) U.S. Cl.
CPC .............. *C03C 17/366* (2013.01); *C09D 1/00* (2013.01); *C03C 2217/27* (2013.01); *C03C 2217/281* (2013.01); *C03C 2217/73* (2013.01); *C03C 2217/734* (2013.01); *C03C 2217/78* (2013.01)

(56) References Cited

U.S. PATENT DOCUMENTS

| | | | |
|---|---|---|---|
| 9,163,150 B2 | 10/2015 | Broadway et al. | |
| 2007/0188871 A1* | 8/2007 | Fleury | B32B 17/10036 359/586 |
| 2008/0075976 A1* | 3/2008 | Yamamoto | C23C 30/005 428/704 |
| 2009/0195865 A1 | 8/2009 | Kleideiter et al. | |
| 2009/0274901 A1 | 11/2009 | Roquiny | |
| 2012/0219821 A1 | 8/2012 | Frank et al. | |
| 2014/0198389 A1* | 7/2014 | Laurent | C03C 17/36 359/585 |
| 2014/0240821 A1* | 8/2014 | Ballou | G02B 5/0858 427/162 |
| 2015/0070755 A1* | 3/2015 | Singh | C03C 17/3435 359/359 |
| 2015/0321950 A1* | 11/2015 | Fischer | B32B 17/10036 204/192.29 |
| 2016/0097885 A1* | 4/2016 | Comstock, II | G02B 5/08 359/359 |

FOREIGN PATENT DOCUMENTS

| | | |
|---|---|---|
| WO | WO 99/64900 | 12/1999 |
| WO | WO 2012/093238 | 7/2012 |
| WO | WO 2012/118468 | 9/2012 |
| WO | WO 2013/055495 | 4/2013 |
| WO | WO 2014/095388 | 6/2014 |

OTHER PUBLICATIONS

Hsueh et al "Effect of nitrogen content and substrate bias on mechanical and corrosion properties of high-entropy (AlCrAiTiZr)(100-x)N(x)" Surf & Tech 206 (2012) p. 4106-4112.*

Lin et al "Multi-component nitride derived from Ti—Al—Cr—Si—V target in RF magnetron sputter" Surf & Coat Tech 201 (2007) p. 6304-6308.*

Lai et al "Effect of substrate bias on the structure and properties of multi-element (AlCrTaTiZr)N coatings" J.Phys. D:Appl. Phys. 39 (2006) p. 4628-4633.*

U.S. Appl. No. 15/214,932, filed Jul. 20, 2016; Blush.

Sheng Guo, "Phase Stability in High Entropy Alloys: Formation of Solid-Solution Phase or Amorphous Phase," El Sevier, Progress in Natural Science: Materials International 21(2011) 433-446, Aug. 21, 2011, 14 pages.

* cited by examiner

COATED ARTICLE SUPPORTING HIGH-ENTROPY NITRIDE AND/OR OXIDE THIN FILM INCLUSIVE COATING, AND/OR METHOD OF MAKING THE SAME

FIELD OF THE INVENTION

Certain example embodiments of this invention relate to coated articles and/or methods of making the same. More particularly, certain example embodiments of this invention relate to coated articles supporting high-entropy nitride and/or oxide thing film inclusive coatings, and/or methods of making the same.

BACKGROUND AND SUMMARY

Thin film coatings are used for a variety of different applications including, for example, low-emissivity (low-E) or solar control coatings, antireflective (AR) coatings, anti-scratch coatings, etc. Such thin film coatings typically comprise a plurality of thin film layers, and each thin film layer typically includes one, two, or three different materials.

High-entropy alloys have been known and described since the mid-1990s, but they have only relatively recently become the focus of research in the materials science and engineering fields. As is known in the art, current high-entropy alloys typically include five or more metals, with the metals being included in equal or nearly equal quantities. These types of high-entropy alloys have desirable properties in that they tend to be heat stable and mechanically durable. Indeed, these types of high-entropy alloys have advantageous properties including their ability to survive high temperature processing, as well as good strength-to-weight ratios, fracture resistance, tensile strength, and corrosion and oxidation resistance.

High-entropy alloys tend to have better mechanical properties compared to traditional alloys. Current research relating to high-entropy alloys tends to focus on hard-facing coatings. The inventor has determined, however, that it would be desirable to use high-entropy alloys in optical coatings.

Certain example embodiments relate to alloy systems that can be used in optical coatings. These alloys systems are heat stable because of the extremely high entropic contribution to their free energies. A first material system that may be used in connection with certain example embodiments includes SiAlN with one or more (and preferably two or more) of elements such as Hf, Y, Zr, Ti, Ta, and Nb. A second material system that may be used in connection with certain example embodiments includes TiO, with one or more (and preferably two or more) of elements such as Fe, Co, Ni, Sn, Zn, and N. In both example material systems, the presence of four or more elements aids in increasing the entropic effect on high-temperature stability. The material systems may be high-index materials that can serve as a substitute for titanium oxide in layer stacks, in some example applications.

The thin films described herein may be used in applications including, for example, low-emissivity or solar control coatings, AR coatings, anti-scratch coatings, wear-resistant coatings, corrosion-resistant coatings, etc., as appropriate with the optics of the coating, the layer stack, and what is desired in the end-application. The thin films described herein may be used as the outermost layers in layer stacks, diffusion barrier layers, high-index layers, and/or the like.

Methods of making the coated articles disclosed herein also are contemplated.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

As noted above, current high-entropy alloys are known to have high temperature stability because of extremely high entropic contributions. This is related to their equiatomic or near-equiatomic compositions, and the high number of elemental constituents. It is known that $\Delta G = \Delta H - T\Delta S$ (where $\Delta G$ is the change in Gibbs free energy, $\Delta H$ is enthalpy, T is temperature, and $\Delta S$ is entropy). The phase with the lowest Gibbs free energy of formation will be the phase formed at equilibrium, so increasing entropy will increase the likelihood of a phase being stable.

Figure 1:
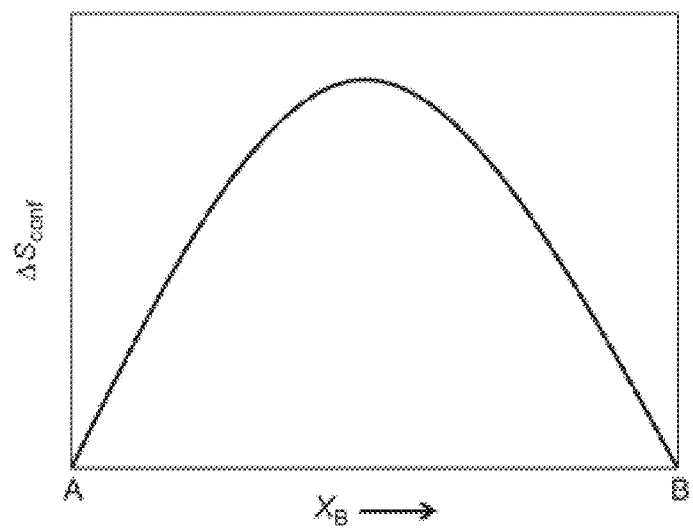
FIG. 1 is a graph plotting the entropy of a configuration against compositions including materials A and B (with the amount of material B increasing from left to right)
Figure 2:
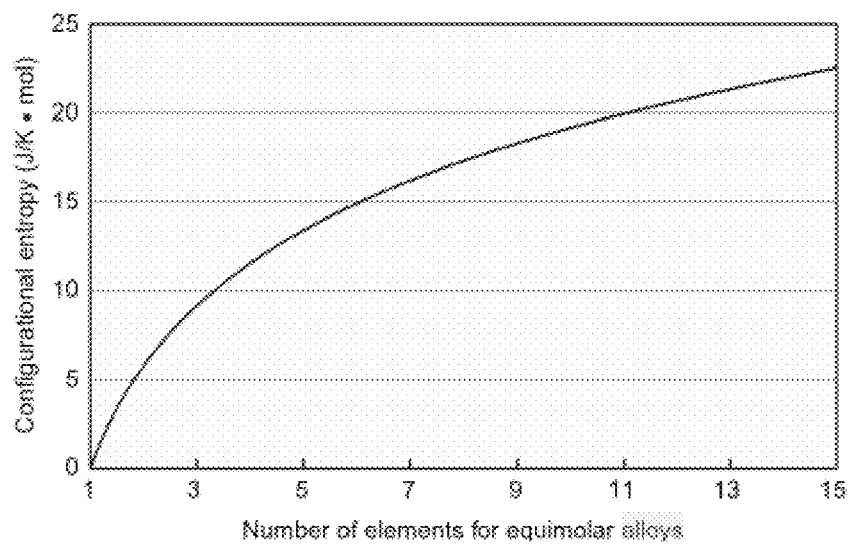
FIG. 2 is a graph plotting configurational entropy against the number of elements, for equimolar alloys.

This is shown graphically in FIGS. 1 and 2. More particularly, FIG. 1 is a graph plotting the entropy of a configuration against compositions including materials A and B (with the amount of material B increasing from left to right). As shown in FIG. 1, configurational entropy reaches a maximum at (or at least near) the equiatomic composition. FIG. 2 is a graph plotting configurational entropy against the number of elements, for equimolar alloys. FIG. 2 follows from the following: $\Delta S_{config} = -R(X_A \ln X_A + X_B \ln X_B + \ldots)$, where $\Delta S_{config}$ is the entropy of the configuration, R is the ideal gas constant, $X_A$ is the amount of material A, $X_B$ is the amount of material B, etc.

The following table provides typical configurational entropies of equiatomic alloys with constituent elements, for alloys with up to 13 different constituent elements. It will be appreciated that the following table provides a "general rule" for high entropy materials.

| # | $\Delta S_{config}$ |
|---|---|
| 1 | 0 |
| 2 | 0.69R |
| 3 | 1.1R |
| 4 | 1.39R |
| 5 | 1.61R |
| 6 | 1.79R |
| 7 | 1.95R |
| 8 | 2.08R |
| 9 | 2.2R |
| 10 | 2.3R |
| 11 | 2.4R |
| 12 | 2.49R |
| 13 | 2.57R |

Generally speaking, traditional low entropy materials have a $\Delta S_{config}$ of about 1 R (or sometimes lower), medium entropy materials have a $\Delta S_{config}$ of about 1 R to about 1.5 R, and high entropy materials have a $\Delta S_{config}$ of greater than about 1.5 R. Again, it will be appreciated that these values represent a general "rule of thumb" for high entropy alloys. In this regard, it will be appreciated that the lines between low and medium, and medium and high, need not be precisely delineated. For instance, some materials disclosed and claimed herein having four constituent materials nonetheless may be considered high-entropy for these purposes, even though $\Delta S_{config}$ might ordinarily be expected to be slightly less than 1.5 R.

Configurational entropy enhances mutual solubility between constituents and leads to simpler phases. For example, it is possible to produce amorphous materials with high amounts of disorder, amorphous materials with some short range order, single phase materials with high amounts of disorder, and new eutectic systems with two phases of high disorder. The number of phases observed in high-entropy systems is significantly less than the maximum number of phases expected from the phase rule. This is because configurational entropy enhances mutual solubility, and diffusivities are low which, in turn, kinetically constrains phase formation.

It is at least in theory possible to increase the effect of the enthalpic term by tailoring materials' constituent concentrations while the atomic size differences are held constant. Typically, in high-entropy alloys, the higher the atomic size difference of the constituents, the higher the likelihood of being able to form a stable amorphous material.

Certain example embodiments relate to coated articles supporting high-entropy nitride and/or oxide thing film inclusive coatings, and/or methods of making the same. For example, heat-stable dielectric layers with advantageous mechanical properties may be provided in certain example embodiments. These layers can be tailored to have optics and/or performance tailored to meet the needs of their potential uses (e.g., via doping or the like). This may include adjustments with respect to transmission/reflection, absorption, sheet resistance, emissivity, etc. As a result, thin films described herein may be used in applications including, for example, low-emissivity or solar control coatings, AR coatings, anti-scratch coatings, wear-resistant coatings, corrosion-resistant coatings, etc., as appropriate with the optics of the coating, the layer stack, and what is desired in the end-application. The thin films described herein may be used as the outermost layers in layer stacks, diffusion barrier layers, high-index layers, and/or the like.

Modeling of high entropy materials has been performed for Bulk Metallic Glasses (BMG). Higher entropy increases the BMG's ability to stay in an amorphous state, which is more heat stable.

The inventor has completed the same general modeling to identify families of oxide and/or nitride materials that show similar entropies and enthalpies as amorphous BMGs. In the case of oxide and/or nitride materials, high-entropy thin films also may have high indexes of refraction, which may be useful in certain example applications. For instance, in certain example embodiments, the index of refraction has reached 3.4 or 3.5, although tuning to lower levels (e.g., 1.8-2.4, for example) has been possible in some example instances. The boundary conditions used to identify high-entropy oxide and/or nitride thin films included three criteria. First, with respect to the mixing enthalpy ($\Delta H_{mix}$), −49 kJ/mol<$\Delta H_{mix}$<−5.5 kJ/mol. Second, with respect to the mixing entropy ($\Delta S_{mix}$), 7<$\Delta S_{mix}$<16 J/(K*mol). Third, average size difference is greater than 7 Å.

The entropy of mixing is defined as follows:

$$\Delta S_{mix} = -R \sum_{i=1}^{n} c_i \ln c_i$$

The enthalpy of mixing is defined as follows:

$$\Delta H_{mix} = \sum_{i=1, i \neq j}^{n} \Omega_{ij} c_i c_j$$

Atomic size difference is defined as follows:

$$\delta = 100 \sqrt{\sum_{i=1}^{n} c_i (1 - r_i/\bar{r})^2}$$

In these equations, R is the ideal gas constant as mentioned above, $c_i$ is the atomic percentage of the ith element, n is the number of elements in the composition, $\Omega_{ij} = 4\Delta_{mix}^{AB}$ (where $\Delta H_{mix}^{AB}$ is the binary enthalpy of mixing for elements A and B), $r_i$ is the atomic radius of the ith element, and $\bar{r} = \sum_{i=1}^{n} c_i r_i$.

Figure 3A:
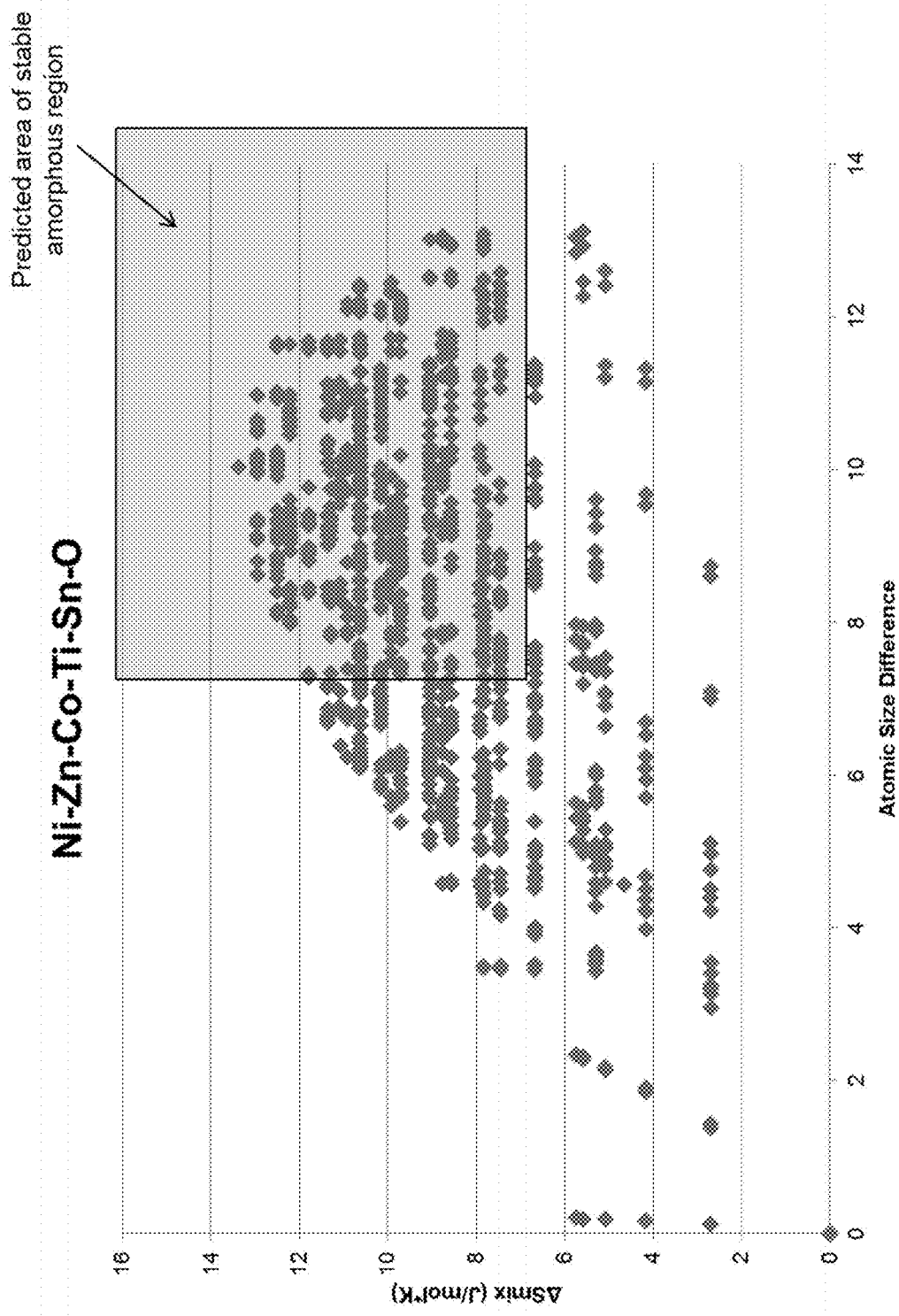
FIGS. 3A-3B are graphs showing a first example system where entropy of mixing, enthalpy of mixing, and atomic size difference parameters are balanced to yield a high-entropy layer in accordance with certain example embodiments.
Figure 3B:
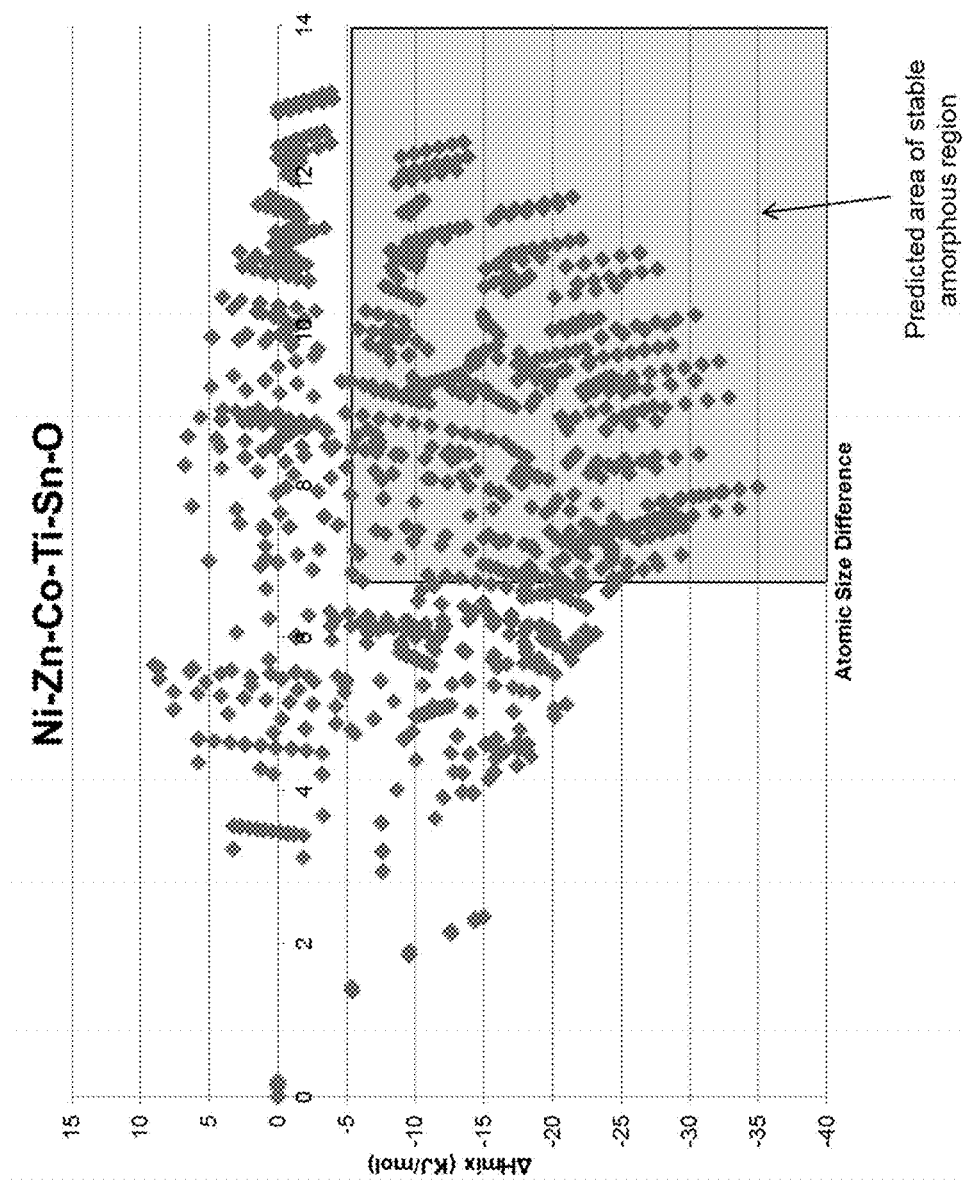

The systems identified above were identified by balancing these criteria. FIGS. 3A-3B are graphs relating to a first example of how these criteria can be balanced in accordance with certain example embodiments. The example described in connection with FIGS. 3A-3B relates to a material comprising Ni—Zn—Co—Ti—Sn—O. The predicted area corresponding to the stable, amorphous region is identified in each drawing.

Figure 4A:
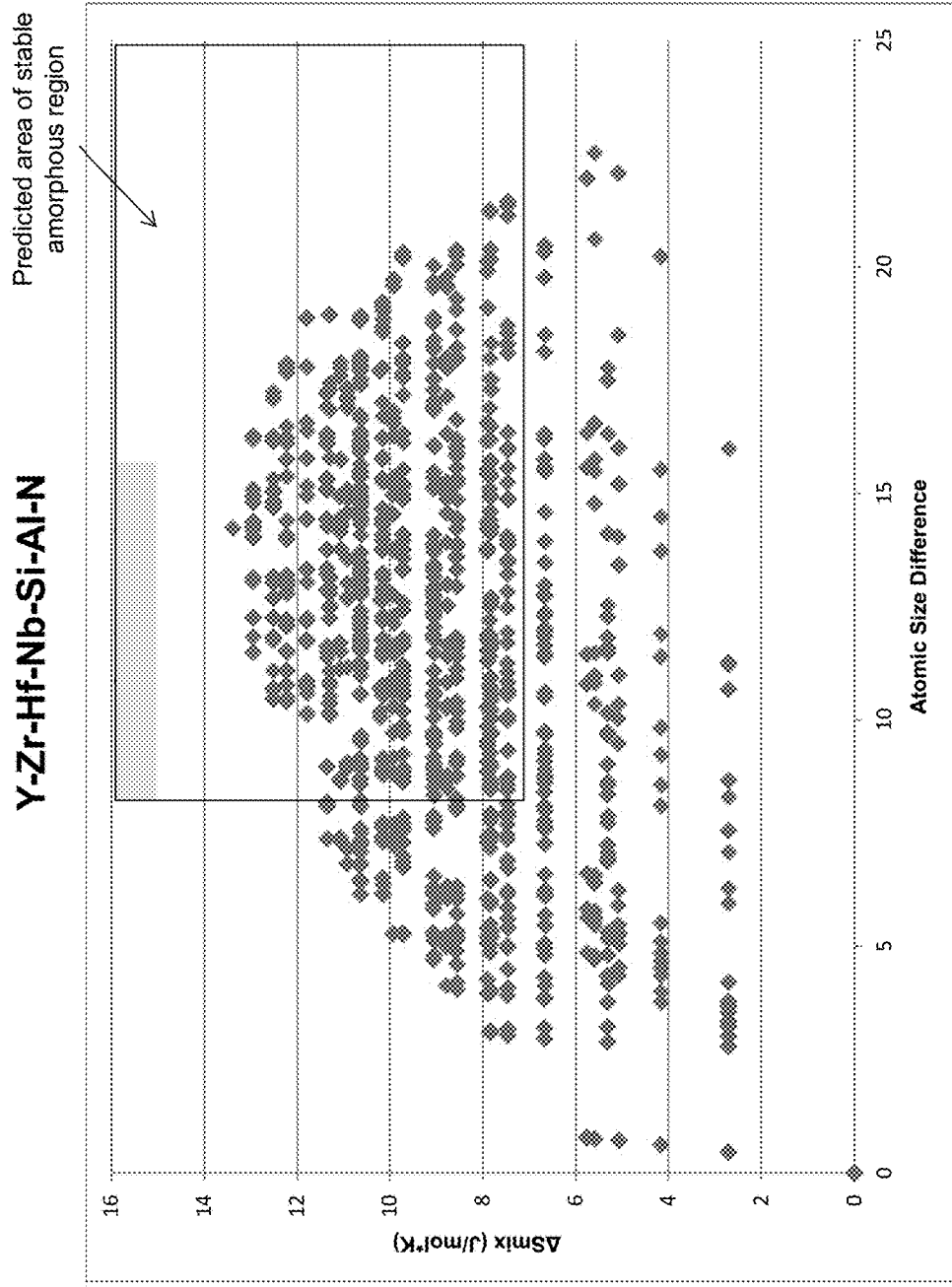
FIGS. 4A-4B are graphs showing a second example system where entropy of mixing, enthalpy of mixing, and atomic size difference parameters are balanced to yield a high-entropy layer in accordance with certain example embodiments.
Figure 4B:
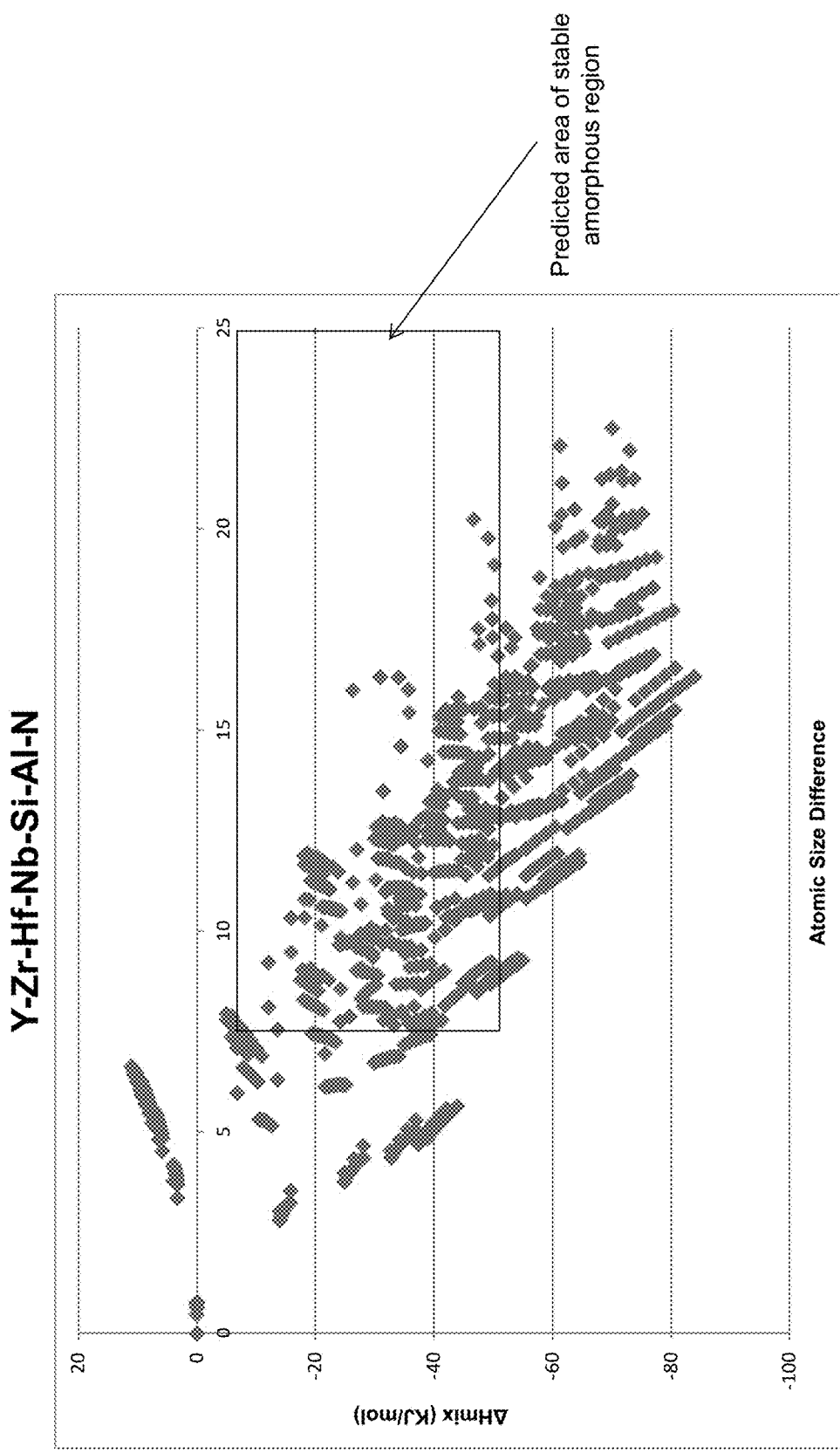

FIGS. 4A-4B are graphs relating to a second example of how these criteria can be balanced in accordance with certain example embodiments. The example described in connection with FIGS. 4A-4B relates to a material comprising Y—Zr—Hf—Nb—Si—Al—N. As above, the predicted area corresponding to the stable, amorphous region is identified in each drawing.

In FIGS. 3A and 4A, the entropy of mixing is plotted against the atomic size difference. In FIGS. 3B and 4B, the enthalpy of mixing is plotted against the atomic size difference.

Two sample alloys were tested and found to be heat stable, even when exposed to temperatures up to 650 degrees C. for up to 7 minutes. (In certain example embodiments, materials may be heat stable, even when exposed to temperatures up to 650 degrees C. for up to 5 minutes, more preferably up to 10 min, and still more preferably up to 15 minutes.) Both samples were found to be amorphous before and after heat treatment. The first sample was a system comprising Al—Si—Hf—N. More particularly, the first system included about 66% Al, 14% Si, 20% Hf, and was nitride. The index of refraction (at 550 nm) was measured at 2.31. The atomic size difference for the first sample was 9.4 Å, the entropy of mixing for the first sample was 7.42 kJ/mol, and the enthalpy of mixing for the first sample was −42.6 J/(K*mol).

The second sample was a system comprising Y—Zr—Si—Al—N. More particularly, the second system included about 65.2% Y, 7.2% Zr, 1.9% Si, 25.1% Al, and was nitride. The index of refraction (at 550 nm) was measured at 2.34. The atomic size difference for the second sample was 10.5 Å, the entropy of mixing for the second sample was 7.5 kJ/mol, and the enthalpy of mixing for the second sample was −30.8 J/(K*mol).

It will be appreciated that layers comprising the systems described herein may be applied by any suitable technique such as, for example, a physical vapor deposition technique such as sputtering or the like.

Figure 5:
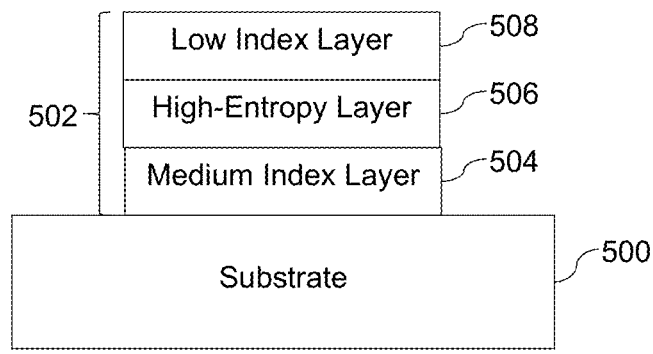
FIG. 5 is a cross-sectional view of an example antireflective coating that incorporates a high-entropy layer in accordance with certain example embodiments.
Figure 6:
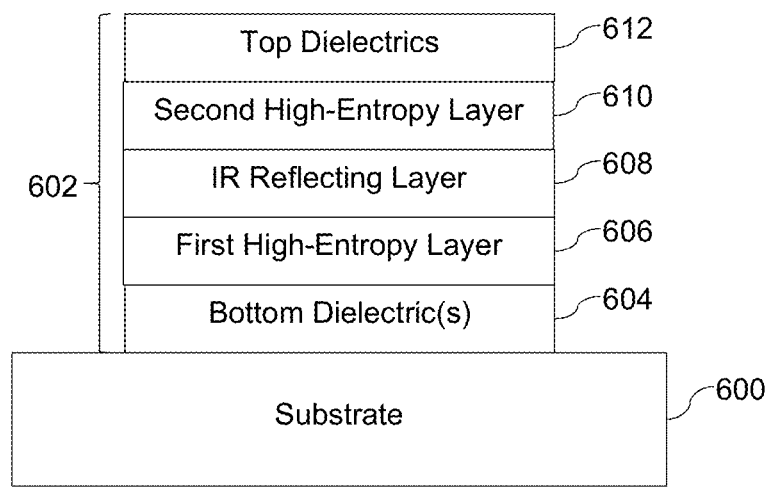
FIG. 6 is a cross-sectional view of a first example low-emissivity coating that incorporates a high-entropy layer in accordance with certain example embodiments.
Figure 7:
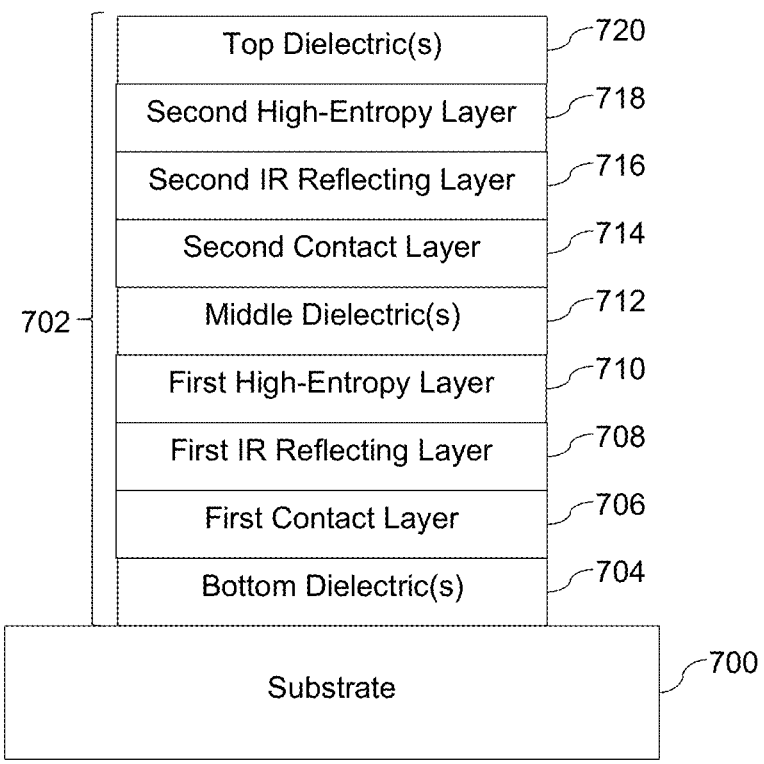
FIG. 7 is a cross-sectional view of a second example low-emissivity coating that incorporates a high-entropy layer in accordance with certain example embodiments.

As noted above, thin films described herein may be used in applications including, for example, low-emissivity or solar control coatings, AR coatings, anti-scratch coatings, wear-resistant coatings, corrosion-resistant coatings, etc. FIGS. 5-7 schematically illustrate some of these example applications.

More particularly, FIG. 5 is a cross-sectional view of an example antireflective coating 502 that incorporates a high-entropy layer in accordance with certain example embodiments. FIG. 5 includes a substrate (e.g., a glass substrate) supporting the antireflective coating 502. The antireflective coating 502 includes, in order moving away from the substrate, a medium index layer 504, a high-entropy layer 506, and a low index layer 508. In this example configuration, the high-entropy layer 506 has a high index of refraction.

The low index layer 508 may be of or include silicon or an oxide thereof, MgF, or their alloyed oxide and fluoride.

In certain example embodiments, the medium index layer 504 is a bottom layer of the AR coating 502 and has an index of refraction (n) of from about 1.60 to 2.0, more preferably from about 1.65 to 1.9, even more preferably from about 1.7 to 1.8, and most preferably from about 1.7 to 1.79 (at 550 nm). At 380 nm, in certain example embodiments, an ideal refractive index of medium index layer 504 is from about 1.8 to 2.0. In further example embodiments, the index of refraction of medium index layer 504 is from about 1.65-1.8 at 780 nm.

In certain instances, it is advantageous that the material(s) comprising medium index layer 504 and the high-entropy layer 506 have desired optical and mechanical properties in the as-deposited state as well as after exposure to temperatures typical in tempering and/or heat treating environments. For the high-entropy layer 506, this may be accomplished by using the techniques disclosed herein. For the medium index layer 504, it will be appreciated that the use of silicon oxynitride (e.g., SiOxNy) can aid in this respect. For example, silicon oxynitride can be deposited to have an index of refraction of from about 1.60 to 2.0, more preferably from about 1.65 to 1.9, even more preferably from about 1.7 to 1.85 or 1.7 to 1.8, and most preferably from about 1.7 to 1.79 (at 550 nm), and will not significantly degrade in its mechanical or optical properties upon tempering and/or heat treatment. Moreover, in certain example embodiments, a layer of or comprising silicon oxynitride (e.g., SiOxNy) advantageously has a compressive residual stress in both the as-coated and heat-treated states.

Medium index layer 504 preferably has a thickness of from about 75 to 135 nm, more preferably from about 80 to 130 nm, even more preferably from about 89 to 120 nm, and most preferably from about 94 to 115 nm.

The high-entropy layer 506 may be the high index layer and noted above, and it may have an index of refraction of at least about 2.0, preferably from about 2.1 to 2.7, more preferably from about 2.25 to 2.55, and most preferably from about 2.3 to 2.5 (at 550 nm) in certain example embodiments. In certain example embodiments, an ideal index of refraction of high-entropy layer layer 506 at 380 nm may be from about 2.7 to 2.9 (and all sub-ranges therebetween). In further example embodiments, an ideal index of refraction of high-entropy layer 506 at 780 nm may be from about 2.2 to 2.4 (and all sub-ranges therebetween). The high-entropy layer 506 preferably has a thickness of from about 5 to 50 nm, more preferably from about 10 to 35 nm, even more preferably from about 12 to 22 nm, and most preferably from about 15 to 22 nm. In certain exemplary embodiments, the high-entropy layer 506 has a thickness of less than about 25 nm. It will be appreciated that the thermal stability of the high-entropy layer 506 may be advantageous in providing net compressive stress in the layer stack 502, both before and after tempering. Thus, the thickness of the high-entropy layer 506 may be increased beyond these values.

In certain example embodiments of this invention, the low index layer 508 has an index of refraction of from about 1.4 to 1.6, more preferably from about 1.45 to 1.55, and most preferably from about 1.48 to 1.52 (at 550 nm) in certain example embodiments. In certain example embodiments, an ideal index of refraction of low index layer 508 at 380 nm may be from about 1.48 to 1.52 (and all sub-ranges therebetween). In further example embodiments, an ideal index of refraction of low index layer 508 at 780 nm may be from about 1.46 to 1.5 (and all sub-ranges therebetween). In certain example embodiments, low index layer 508 may have a thickness of from about 70 to 130 nm, more preferably from about 80 to 120 nm, even more preferably from about 89 to 109 nm, and most preferably from about 100 to 110 nm. An example material for use as a low index layer 508 is silicon oxide (e.g., SiOx).

The AR coating 502 may be provided on only one major surface of glass substrate 502 as shown in FIG. 5. However, it also may be provided on both major surfaces in different example embodiments.

In general, the high-entropy layers described herein may be used in connection with the antireflective coatings described in U.S. Pat. No. 8,693,097, except that the high-entropy layers described herein may be used in place of the titanium oxide and other materials of the high-index layer described therein. The entire content of the '097 patent is hereby incorporated herein by reference. Similarly, the high-entropy layers described herein may be used in connection with the antireflective coatings described in U.S. Pat. No. 9,163,150, except that the high-entropy layers described herein may be used in place of the titanium oxide and other materials of the high-index layer described therein, and/or for the stress-reducing layer. The entire content of the '150 patent is hereby incorporated herein by reference.

FIG. 6 is a cross-sectional view of a first example low-emissivity coating 602 that incorporates a high-entropy layer in accordance with certain example embodiments. FIG. 6 shows a substrate 600 supporting the low-E coating 602. The low-E coating comprises, in order moving away from the substrate 600, bottom dielectric layer(s) 604, a first high-entropy layer 606, an infrared (IR) reflecting layer 608, a second high-entropy layer 610, and top dielectric layer(s) 612. The bottom dielectric layer(s) 604 may include one or more layers, and each may be a layer of or including tin oxide, titanium oxide, silicon oxide, silicon nitride, silicon oxynitride, and/or the like. A silicon-inclusive layer may be provided adjacent the substrate in certain example embodiments. The first and second high-entropy layers 606 and 610 may sandwich the IR reflecting layer 608. The IR reflecting layer 608 may be a layer of or including silver. In certain example embodiments, one or both of the high-entropy layers 606 and 610 may directly contact the IR reflecting layer 608. In certain example embodiments, one of the high-entropy layers 606 and 610 may be replaced with a layer comprising Ni, Cr, and/or Ti, or an oxide thereof. The first high-entropy layer 606 may in certain example embodiments be replaced with a layer comprising zinc oxide. The top dielectric layer(s) 612 may include one or more layers, and each may be a layer of or including tin oxide, titanium oxide, silicon oxide, silicon nitride, silicon oxynitride, and/or the like, zirconium oxide, and/or the like.

It will be appreciated that more than one IR reflecting layer may be provided in connection with a low-E layer stack system. For example, FIG. 7 is a cross-sectional view of a second example low-emissivity coating 702 that incorporates a high-entropy layer in accordance with certain example embodiments. FIG. 7 shows a substrate 700 supporting the low-emissivity coating 702. The low-E coating 702 includes, in order moving away from the substrate 700, bottom dielectric layer(s) 704, a first contact layer 706, a first IR reflecting layer 708, a first high-entropy layer 710, middle dielectric layer(s) 712, a second contact layer 714, a second IR reflecting layer 716, a second high-entropy layer 718, and top dielectric layer(s) 720. In general, the materials identified above may be used here, as well. Similarly, the various modifications discussed above (e.g., replacement of contact layers with high-entropy layers, adjacencies, etc.) may be as discussed above, as well. The bottom and middle dielectric layer(s) may be the same as, or different from, one another.

The FIG. 6 and FIG. 7 embodiments advantageously may be heat treatable (e.g., thermally temperable). In some cases, the presence of the high-entropy layer(s) may help stop oxygen migration and thus may aid in protecting the IR reflecting layers. Furthermore, the presence of the high-entropy layer(s) may in some instances help ensure that little to now color shift occurs. In certain example embodiments, the delta E* value will be less than 3, and more preferably less than 2.

Although certain example embodiments have been described as including glass substrates, it will be appreciated that other types of transparent substrates may be used in different example embodiments. In addition, although certain applications have been described, it will be appreciated that the techniques disclosed herein may be used in connection with a variety of commercial and/or residential window, spandrel, merchandizer, signage, electronic device, and/or other applications. Such applications may be monolithic, laminated, and/or involve insulating glass (IG), vacuum insulating glass (VIG), and/or other types of units and/or arrangements.

The terms "heat treatment" and "heat treating" as used herein mean heating the article to a temperature sufficient to achieve thermal tempering and/or heat strengthening of the glass-inclusive article. This definition includes, for example, heating a coated article in an oven or furnace at a temperature of at least about 550 degrees C., more preferably at least about 580 degrees C., more preferably at least about 600 degrees C., more preferably at least about 620 degrees C., and most preferably at least about 650 degrees C. for a sufficient period to allow tempering and/or heat strengthening. This may be for at least about two minutes, up to about 10 minutes, up to 15 minutes, etc., in certain example embodiments.

As used herein, the terms "on," "supported by," and the like should not be interpreted to mean that two elements are directly adjacent to one another unless explicitly stated. In other words, a first layer may be said to be "on" or "supported by" a second layer, even if there are one or more layers therebetween.

In certain example embodiments, there is provided a coated article comprising a substrate and a thin film coating formed thereon, with the coating comprising at least one high entropy thin film layer, and with the high entropy thin film layer including SiAlNx and one or more of: Hafnium, Niobium, Tantalum, Titanium, Yttrium, and Zirconium.

In addition to the features of the previous paragraph, in certain example embodiments, the high entropy thin film layer may comprise SiAlNx and two or more of: Hafnium, Niobium, Tantalum, Titanium, Yttrium, and Zirconium. For example, the high entropy thin film layer may comprise SiAlNx, as well as Hafnium, Zirconium, and/or Yttrium.

In addition to the features of either of the two previous paragraphs, in certain example embodiments, the high entropy thin film layer may have a ΔHmix<−5.5 kJ/mol, ΔHmix>−49 kJ/mol; a ΔSmix>7 J/(mol*K), ΔSmix<16 J/(mol*K); and/or an average atomic size difference of >7.

In addition to the features of any of the three previous paragraphs, in certain example embodiments, the high entropy thin film layer may have an average atomic size difference between 7 and 20.

In addition to the features of any of the four previous paragraphs, in certain example embodiments, the thin film coating may be heat stable up to a temperature of 650° C., e.g., and for a time of up to 5 minutes, more preferably up to 10 minutes, and still more preferably up to 15 minutes.

In addition to the features of any of the five previous paragraphs, in certain example embodiments, the substrate with the thin film coating thereon may be thermally temperable.

In addition to the features of any of the six previous paragraphs, in certain example embodiments, the thin film coating may comprise a plurality of thin film layers, e.g., with the high entropy thin film layer being the outermost layer in the thin film coating. In certain example embodiments, the thin film coating may be an anti-scratch coating.

In addition to the features of any of the seven previous paragraphs, in certain example embodiments, the thin film coating may be a low-emissivity coating that comprises a plurality of thin film layers, e.g., with the thin film coating including an infrared reflecting layer sandwiched between first and second high entropy thin film layers. In such cases, in certain example embodiments, the outermost layer of the thin film coating may be a third high entropy thin film layer, and/or the thin film coating may be heat treatable and/or may have a delta E* value of <2. As an alternative, in addition to the features of any of the seven previous paragraphs, in certain example embodiments, the thin film coating may be an anti-reflective coating that comprises a plurality of thin film layers, e.g., with the high entropy thin film layer being an overcoat for the anti-reflective coating.

In addition to the features of any of the eight previous paragraphs, in certain example embodiments, the high entropy thin film layer may have an index of refraction of 1.8-2.4 (e.g., if the thin film coating is an antireflective coating).

In addition to the features of any of the nine previous paragraphs, in certain example embodiments, the high entropy thin film layer may have a thickness of 1-500 nm (e.g., 10-300 nm).

In addition to the features of any of the 10 previous paragraphs, in certain example embodiments, the substrate with the thin film coating thereon may allow for at least 80% visible transmission.

In certain example embodiments, there is provided a method of making a coated article comprising a substrate and a thin film coating formed thereon, with the method comprising: forming the coating, directly or indirectly, on the substrate (e.g., via a PVD technique), the coating comprising at least one high entropy thin film layer, the high entropy thin film layer including SiAlNx and one or more of: Hafnium, Niobium, Tantalum, Titanium, Yttrium, and Zirconium. The features of any of the 10 previous paragraphs may be used with this method, in certain example embodiments.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A coated article comprising
a substrate;
and a low-emissivity (low-E) coating formed thereon on the substrate, the coating comprising an infrared (IR) reflecting layer comprising silver sandwiched between at least first and second dielectric layers; and
wherein at least one of the first and second dielectric layers of the low-E coating is a high entropy layer comprising a nitride of silicon and aluminum that further includes at least two of: Hafnium, Niobium, Tantalum, Titanium, Yttrium, and Zirconium.

2. The coated article of claim 1, wherein the high entropy layer comprises at least two of Hafnium, Zirconium, and Yttrium.

3. The coated article of claim 1, wherein the high entropy layer has a ΔHmix<−5.5 kJ/mol, ΔHmix>−49 kJ/mol, and an average atomic size difference of >7.

4. The coated article of claim 1, wherein the high entropy layer has a ΔSmix>7 J/(mol*K), ΔSmix<16 J/(mol*K), and an average atomic size difference of >7.

5. The coated article of claim 1, wherein the high entropy layer has an average atomic size difference between 7 and 20.

6. The coated article of claim 1, wherein the high entropy layer is heat stable up to a temperature of 650° C. and for a time of up to 15 minutes.

7. The coated article of claim 1, wherein the coated article is thermally temperable.

8. The coated article of claim 1, wherein the high entropy layer is an outermost layer of the low-E coating.

9. The coated article of claim 1, wherein the thin film coating is heat treatable and has a delta E* value of <2.

10. The coated article of claim 1, wherein the high entropy layer has a thickness of 1-500 nm.

11. The coated article of claim 1, wherein the high entropy layer has a thickness of 10-300 nm.

12. The coated article of claim 1, wherein the coated article has at least 80% visible transmission.

13. The coated article of claim 1, wherein the high entropy layer has an index of refraction of 1.8-2.4.

* * * * *